United States Patent [19]

Ulug

[11] Patent Number: 4,707,830

[45] Date of Patent: Nov. 17, 1987

[54] TOKEN PASSING LAN USING A PLURALITY OF TOKENS

[75] Inventor: Mehmet E. Ulug, Schenectady, N.Y.

[73] Assignee: General Electric Company, Schenectady, N.Y.

[21] Appl. No.: 708,452

[22] Filed: Mar. 5, 1985

[51] Int. Cl.⁴ .......................... H04J 3/16; H04J 3/24
[52] U.S. Cl. ........................................ 370/89; 370/94
[58] Field of Search ................. 370/85, 60, 94, 89; 340/825.5

[56] References Cited

U.S. PATENT DOCUMENTS

| | | | |
|---|---|---|---|
| 4,439,856 | 3/1984 | Ulug | 370/85 |
| 4,464,749 | 8/1984 | Ulug | 370/85 |
| 4,491,946 | 1/1985 | Kryskow, Jr. et al. | 370/89 |
| 4,500,989 | 2/1985 | Dalod | 370/85 |
| 4,506,360 | 3/1985 | Kryskow, Jr. et al. | 370/85 |
| 4,507,777 | 3/1985 | Tucker et al. | 370/16 |
| 4,510,599 | 4/1985 | Ulug | 370/85 |
| 4,517,670 | 5/1985 | Ulug | 370/85 |
| 4,551,721 | 11/1985 | Kozlik | 370/85 |
| 4,570,257 | 2/1986 | Olson et al. | 370/85 |
| 4,602,365 | 7/1986 | White et al. | 370/89 |

FOREIGN PATENT DOCUMENTS 0020661 2/1985 Japan .......................... 370/89

Primary Examiner—Douglas W. Olms
Assistant Examiner—Frank M. Scutch, III
Attorney, Agent, or Firm—Richard V. Burgujian; James C. Davis, Jr.; Paul R. Webb, II

[57] ABSTRACT

A token passing local area network LAN is disclosed wherein each bus interface unit BIU monitors the token rotation time to determine if this time exceeds a predetermined maximum and, if so, creates a second token to be passed through the LAN 180° out of phase with the existing token. Further, each BIU monitors token acquisition time, i.e. the time the BIU has a token to the time that the BIU has another token whether or not they are the same token, to determine whether this token acquisition time is below a predetermined minimum value and, if so, a token is destroyed such that only one token is passed between BIUs.

22 Claims, 5 Drawing Figures

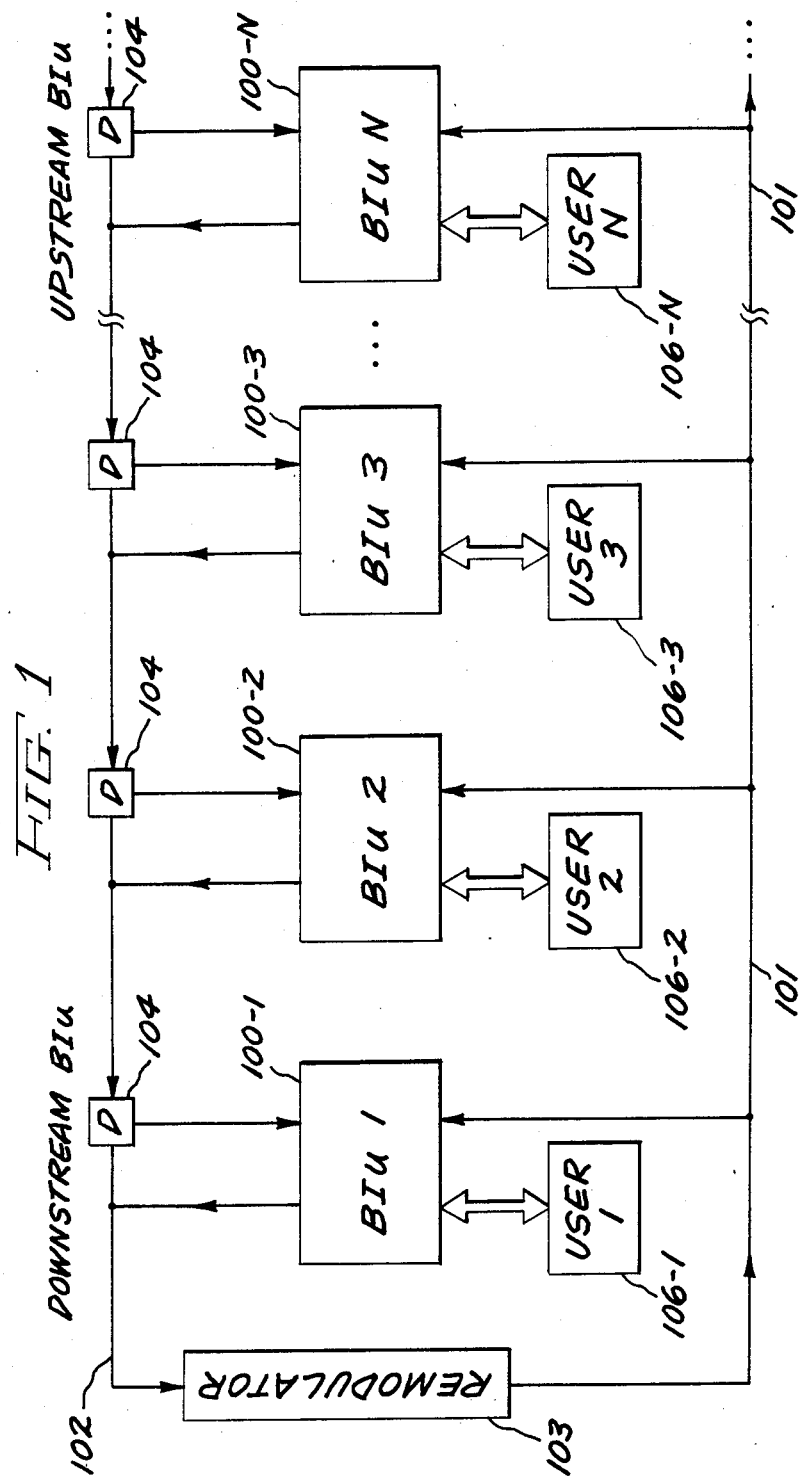

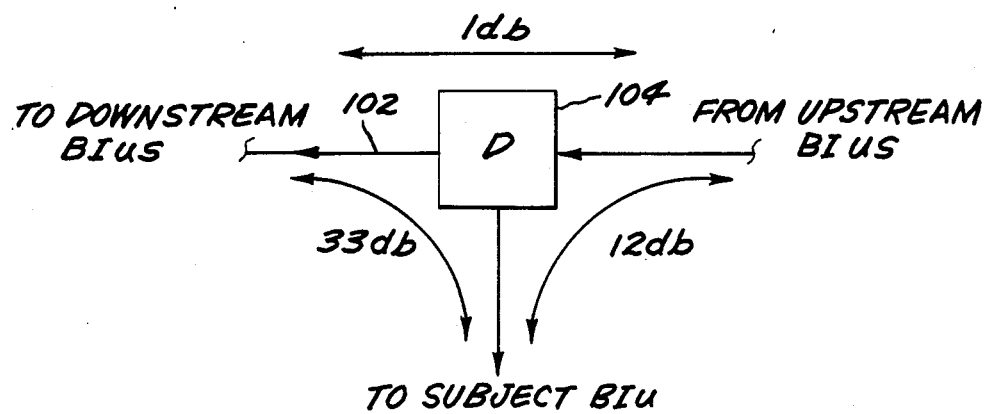
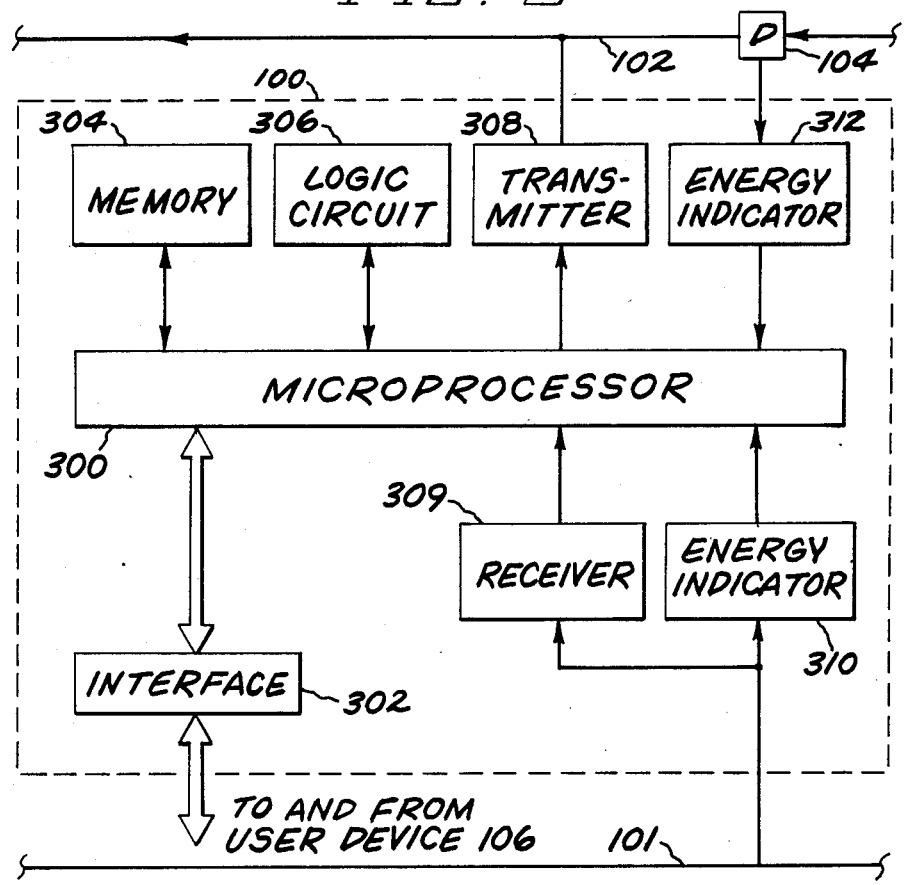

TOKEN PASSING LAN USING A PLURALITY OF TOKENS

BACKGROUND OF THE INVENTION

The present invention is directed in general toward token passing local area networks (LANs) and, more particularly, toward a method for employing a plurality of tokens in a LAN to increase the bandwidth utilization thereof.

Local area networks, wherein a plurality of bus interface units (BIUs) couple their respective users to a common transmission bus for communication therebetween, are becoming more and more prevalent in today's world. With this widespread acceptance comes the need to improve both the speed and efficiency of these systems. The present invention provides a method for increasing the bandwidth utilization of the common transmission bus in a token passing LAN.

Bandwidth utilization as used herein refers to the percentage of time that the transmission bus is used for the transfer of information, e.g. maximum bandwidth utilization would refer to constant transfer of information along the bus or 100% bus loading.

Communication between users in a LAN is accomplished via their respective BIUs using generally two protocols, to wit, a contention protocol and a token passing protocol. Generally, the contention protocol allows all BIUs having a message, or information to transmit to contend for use of the transmission bus. However, this method leads to uncertainty and delays where two or more BIUs contend for use of the bus simultaneously. Therefore, during intervals where many BIUs have messages to transmit, many conflicts occur decreasing the effective bandwidth of the transmission bus. Further, this method does not provide equal access to the bus or allow for prioritization of messages.

In the token passing scheme, a token packet is passed from BIU to BIU and each BIU is permitted to transmit information packets only while in control of the token. While this method provides equal access to the transmission bus, substantial bandwidth is wasted during intervals of high bus utilization. This is because the bus cannot be used, and therefore bandwidth is wasted, from the time a BIU receives the token until the time that BIU begins transmission of its information packet. Further, like the contention protocol, this method does not allow for prioritization of urgent information.

SUMMARY OF THE INVENTION

In accordance with the present invention, the bandwidth utilization and token acquisition time of a token passing LAN is improved by providing a plurality of tokens wherein each BIU is permitted to transmit information while in control of either of these tokens. Each BIU controlling a token is permitted to contend with other BIUs in control of a token for access to the LAN transmission bus. Where two BIUs, each in control of a token, attempt to transmit information packets simultaneously, the upstream BIU prevails and the downstream BIU delays transmission until the bus is no longer busy.

In an improvement upon this method, one token is initially transferred between BIUs, the BIUs being permitted to transmit information packets only while in control of this token. Each BIU monitors the token acquisition time, i.e. that time occurring from the instant when a BIU passes a token until the BIU again acquires the same or a different token. When this time interval is determined to be greater than a predetermined maximum time interval, a second token is added to the network. Conversely, when the token acquisition time interval is determined to be less than a predetermined minimum time interval, a token is destroyed.

By allowing the BIUs to add a token during periods of high bus utilization, i.e. when many BIUs have a message to transmit, token acquisition time can be significantly reduced without substantial increase in time, i.e. the time necessary for a particular token to traverse the bus. Similarly, by allowing the BIUs to destroy a token during periods of low bus utilization, i.e. when the token acquisition time is at a low value, bus access time can be reduced.

In a further improvement, each token is designated to permit transmission of packets having a predetermined priority. In this embodiment, tokens designated to permit transmission of high priority packets will traverse the network faster than tokens designated to permit transmission of low priority packets. This is because there will be fewer high priority packets to be transmitted. Therefore, the token acquisition time for BIUs having high priority packets will be shorter than the token acquisition time for BIUs having low priority packets and the high priority information will be transmitted faster than the low priority information.

It is, therefore, an object of the present invention to provide a token passing local area network wherein a plurality of tokens are passed between BIUs to improve the bandwidth utilization of the local area network.

It is another object of the present invention to provide method for adding a token to a local area network during periods of high bus utilization and further for destroying a token during periods of low utilization.

It is a still further object of the present invention to provide a method by which a plurality of tokens can be passed between BIUs in a local area network wherein each token is designated to allow transmission of packets having a predetermined priority.

BRIEF DESCRIPTION OF THE DRAWINGS

The subject matter which is regarded as invention is particularly pointed out in the claims appended hereto. The invention, however, both as to organization and method of practice, may best be understood from a reading of the following detailed description taken in conjunction with the drawings in which:

FIG. 1 is a illustrative block diagram of a local area network which is particularly suitable for the method of the present invention;

FIG. 2 is a more detailed illustrative block diagram of the directional couplers of FIG. 1;

FIG. 3 is a more detailed block diagram of the BIUs of FIG. 1;

DETAILED DESCRIPTION OF THE DRAWINGS

Figure 4:
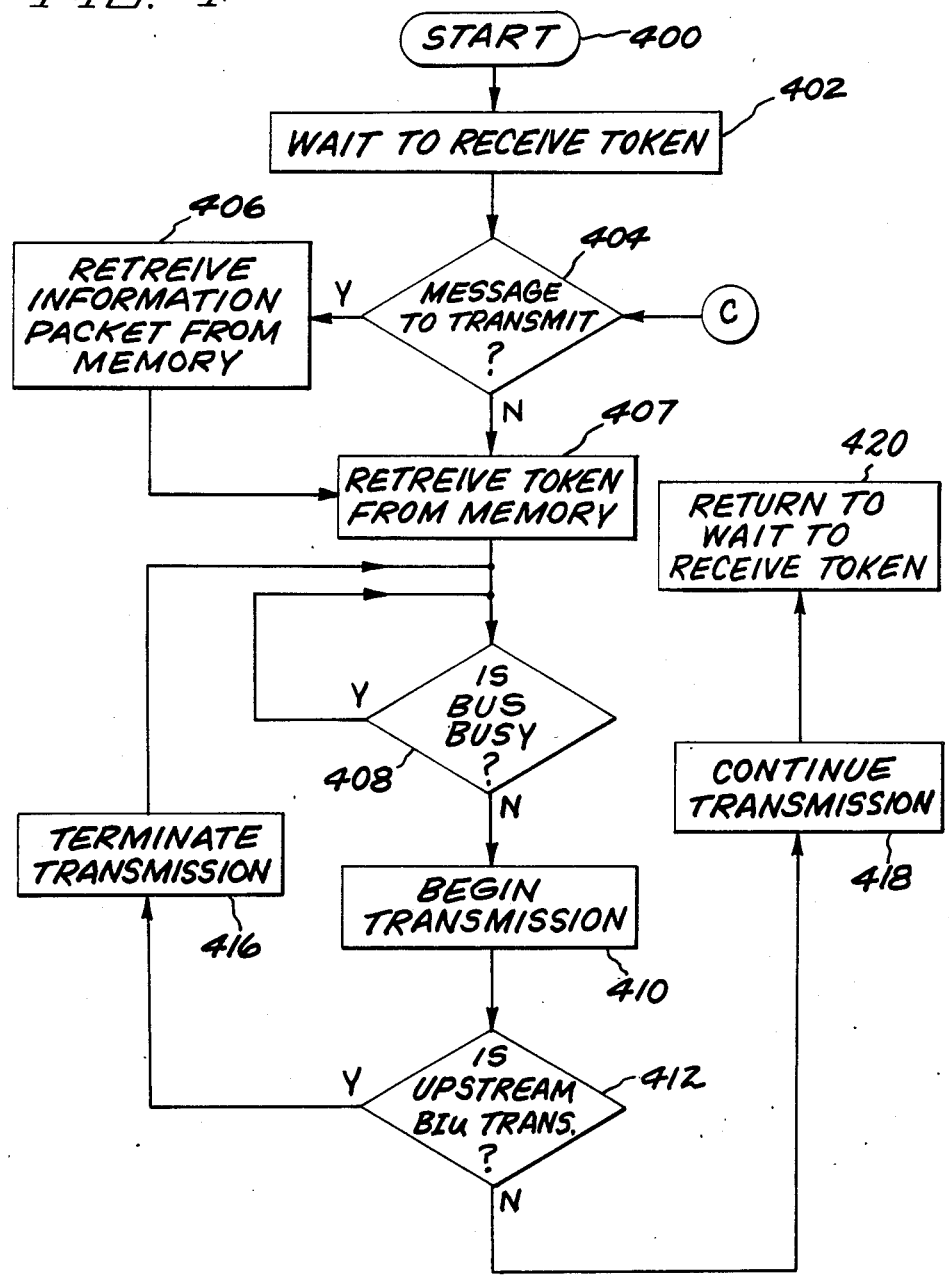
FIG. 4 is a decisional flow diagram illustrating the method by which several BIUs, each in control of a token, contend for use of the transmission bus.

The present invention provides a method by which the bandwidth utilization of a token passing local area network (LAN), such as that described in IEEE Project 802 Local Network Standards, Draft C, Section 4 (1982), may be improved. Token passing LANs are well known in the art. Exemplary of these is U.S. Pat. No. 4,464,749 to Ulug, issued Aug. 7, 1984, and assigned to the assignee of the present invention, which is incorporated herein in its entirety.

The method of the present invention comprises providing a plurality of tokens wherein each bus interface unit (BIU) is permitted to contend for access to the transmission bus only while in control of one or more tokens. LANs using contention protocols are also well known in the art. See, e.g. U.S. Pat. No. (U.S. patent and trademark application Ser. No. 504,716 filed June 15, 1983) to Ulug, and assigned to the assignee of the present invention, which is incorporated herein in its entirety.

A LAN capable of implementing the subject invention is shown in FIG. 1 wherein a plurality of BIUs 100-1 through 100-N are each connected directly to receive bus 101 and transmission bus 102. Receive bus 101 and transmission bus 102 may each comprise any means for transferring digital information between BIUs 100. Particularly, receive bus 101 and transmission bus 102 may comprise electrical transmission means and/or fiber optic transmission means as is known in the art. In the preferred embodiment, receive bus 101 and transmission bus 102 each comprise a CATV cable such as those readily available from the Gerard Co.

Receive bus 101 is shown coupled to transmission bus 102 via a remodulator 103. Remodulator 103 is provided to receive information placed on transmission bus 102 and retransmit this information on receive bus 101. In LANs where transmission bus 102 and receive bus 101 comprise the same physical cable, remodulator 103 may also comprise a frequency translator to receive information on one frequency and transmit on another. Devices suitable for use as remodulator 103 are well known in the art. See, e.g. the afore-referenced U.S. Pat. No. (U.S. patent and trademark application Ser. No. 504,716) to Ulug.

Each BIU 100 is further coupled to transmission bus 102 via a directional coupler 104. With reference to FIG. 2, a block diagram is provided to illustrate the operation of directional coupler 104. Therein, directional coupler 104 is shown to provide an attenuation factor of approximately 1 decibel in the transverse direction, i.e. from BIU to BIU along transmission bus 102. This relatively low attenuation factor in the transverse direction is provided to allow any BIU along transmission bus 102 to transmit information through each directional coupler 104 to all remaining BIUs coupled to transmission bus 102. A relatively high reverse attenuation factor is provided between the downstream port of directional coupler 104 and the BIU input port of the coupler (typically 33 decibels). This relatively high reverse attenuation factor is provided to prevent information being placed on transmission bus 102 from being received by any upstream BIU, with respect to the transmitting BIU, via directional coupler 104. A moderate forward attenuation factor (typically 12 decibels) is provided from the upstream port of the directional coupler to its BIU input port. This moderate forward direction attenuation factor is provided to allow information placed on transmission bus 102 by an upstream BIU to be received by all downstream BIUs via directional coupler 104.

Directional coupler 104 may comprise any device, or plurality of devices, capable of performing the functions as described above. An exemplary one of said devices is shown and described in the afore-referenced U.S. Pat. No. (U.S. PTO application Ser. No. 504,716) to Ulug.

Referring again to FIG. 1, each BIU 100-1 through 100-N is coupled to a respective user device 106-1 through 106-N for providing a sophisticated interface between the user device and transmission bus 102. User devices 106 may comprise any of a plurality of devices normally found in LANs, e.g. a personal processing device, a printing device, a memory device, etc. Although each user device 106 is shown as a single discrete element, it will be apparent to those skilled in the art that a plurality of user devices may be coupled to the same BIU for communication with receive bus 101 and transmission bus 102 via that BIU.

With reference to FIG. 3, there shown a more detailed illustrative block diagram of each BIU 100. Therein, each BIU 100 is shown to comprise a microprocessor 300 coupled to communicate to its respective user device 106 (not shown) via an interface 302. Interface 302 may comprise any device, or combination of devices, capable of adapting information from user device 106 for use in microprocessor 300 and, conversely, adapting information from microprocessor 300 for use in user device 106.

Microprocessor 300 is shown coupled to a memory device 304. Memory 304 may comprise read only memory (ROM) for permanently storing information, e.g. program information, and/or random access memory (RAM) for temporarily storing information, e.g. messages to be transmitted from its respective user device 106 to transmission bus 102 and/or messages to be transmitted to its respective user device 106 from receive bus 101. Alternatively, memory 304 may be integrated with microprocessor 300.

Microprocessor 300 is also shown coupled to a logic circuit 306. Logic circuit 306 may comprise any support circuitry necessary to adapt microprocessor 300 for use in a token passing local area network generally or for use in a token passing local area network such as the one described herein. For example, logic circuit 306 may comprise timers, latches, comparators, bistables and/or monostables, etc.

Transmission bus 102 is shown coupled to microprocessor 300 via a transmitter 308. Transmitter 308 may comprise any device, or combination of devices, capable of transmitting digital information on transmission bus 102 from microprocessor 300.

Receive bus 101 is shown coupled to microprocessor 300 via a receiver 309. Receiver 309 may be any device, or combination of devices, for receiving the digital transmission provided to receive bus 101 from remodulator 103.

Receive bus 101 is also shown coupled to microprocessor 300 via an energy indicator 310. Energy indicator 310 is provided to supply microprocessor 300 with an indication that energy has been detected on receive bus 101. Energy, as used herein, includes any energy placed on transmission bus 102 and remodulated to receive bus 101 which may be in the form of a token, an information packet, a solicit successor packet, and/or a null packet. Energy indicator 310 provides a logical '0' to microprocessor 300 when no energy is detected on receive bus 101 and, conversely, provides a logical '1' to microprocessor 300 when energy is detected on receive bus 101.

In similar manner, microprocessor 300 is shown coupled to directional coupler 104 via an energy indicator 312. Like energy indicator 310, energy indicator 312 is provided to supply microprocessor 300 with an indication that has been detected from the BIU port of directional coupler 104. Energy indicators 310 and 312 may comprise any device, or combination of devices, capable of providing the energy indications as described above.

Configured in this manner, microprocessor 300 uses the input from energy indicators 310 and 312 to determine whether another BIU is transmitting and, if so, whether the transmission originated from an upstream direction or a downstream direction with respect to the subject BIU. When the input to microprocessor 300 from energy indicator 310 is a logic '1', information has been placed on receive bus 101, i.e. a BIU is transmitting. When a BIU is transmitting and the input to microprocessor 300 from energy indicator 312 is a logic '1', then this transmission originated from an upstream direction with respect to the subject BIU. Conversely, when another BIU is transmitting and the input to microprocessor 300 from energy indicator 312 is a logic '0', then this transmission originated from the subject BIU or a direction downstream of the subject BIU.

Each BIU 100 may comprise a plurality of devices, as described, or may comprise a single integrated semiconductor device capable of performing the functions described above. An exemplary one of such BIUs is shown and described in the aforementioned U.S. Pat. No. 4,464,749 to Ulug.

As mentioned above, the subject invention provides a method for improving the bandwidth utilization of a token passing LAN by providing a plurality of tokens to be passed between BIUs such that each BIU is permitted to contend for access to transmission bus 102 only while in control of one or more tokens. In a token LAN, the bus is idle when a BIU is getting ready to transmit an information packet. This procedure involves thinking time, data processing time and execution of other necessary processes. These all take a finite amount of time, typically in hundreds of microseconds. This is why the token holding time is greater than packet transmission time. The difference between the token holding time and the packet transmission time represents a period during which the bus is empty and channel bandwidth is wasted. Similarly, bandwidth utilization is reduced in a fault condition when one BIU has transmitted a token and this token has not been received free of errors and, therefore, rejected by the succeeding BIU. In this instance, the token must be retransmitted after a predetermined delay thereby wasting bandwidth both during the delay and the retransmission.

The present invention overcomes this waste in bandwidth by providing a second token to be passed from BIU to BIU. During periods of high bus utilization when many or all BIUs have a message to transmit, a BIU in control of the first token will be needing time for data processing during which another BIU in control of the second token can be transmitting. Likewise, during intervals that a BIU in control of the second token is processing data, another BIU in control of the first token can be transmitting. In this manner, the bandwidth of the network can be used by a BIU in control of the first token during intervals that a BIU in control of the second token is processing data, and vice versa, thereby improving the overall bandwidth utilization of the network.

Additionally, by providing a second token during intervals of high bus utilization, token acquisition time, i.e. the time interval from the instant that a BIU has a token until the instant that the same BIU has another token (whether or not the same token), can be approximately halved thereby decreasing the waiting time, i.e. the time that a BIU has to wait to get on the bus and transmit a packet.

The method by which each BIU contends for access to transmission bus 102 may best be described by reference to the decisional flow diagram of FIG. 4. Therein, each BIU coupled to transmission bus 102 during the initial step 400 waits to receive a token, step 402. After receiving the token, the BIU determines whether it has a message to transmit, step 404, and if so, retrieves the message from memory, step 406. Where either the BIU has no message to transmit or the BIU has retrieved the message from memory, the BIU next retrieves a token packet from memory, step 407, such that this token can be transmitted with or without an information packet.

Before transmitting, the BIU checks to determine whether the transmission bus is busy, step 408. In the present invention, this is accomplished by monitoring the input to microprocessor 300 from energy indicator 310 to thereby determine whether energy has been placed on receive bus 101 (FIG. 3). If the transmission bus is busy, the BIU recycles through step 408, continuing to monitor the bus until the bus is no longer busy.

When the transmission bus is determined to be available, the BIU initiates transmission, step 410. Contemporaneous with initiation of transmission, or immediately thereafter, the BIU determines whether an upstream BIU has attempted to initiate transmission, step 412, and if so, the subject BIU immediately terminates its own transmission, step 416, and monitors the transmission bus until it is again idle, step 408. In the embodiment described, step 412 is accomplished by simply monitoring the input to microprocessor 300 from energy indicator 312 to determine whether this input changes state from a logic '0' (no upstream BIUs transmitting) to a logic '1' (upstream BIU transmitting), as described above with reference to FIG. 3.

When the transmission bus is idle, step 408, the BIU has initiated transmission, step 410, and no upstream BIU has attempted to initiate transmission, step 412, the subject BIU will continue its own transmission until the conclusion thereof, step 418, before returning to step 402 where it will again wait to receive the token. It is noted that transmission, as used herein, always includes transmission of the received token and may include transmission of an information or other packet.

In a modification to this method, bandwidth utilization is improved during intervals of high bus utilization by adding a token to the network. In accordance with this modified method, the transmission bus is originally provided with only one token and each BIU is permitted to contend for access to the bus only while in control of that token. Each BIU monitors the token acquisition time such that, during periods of high bus utilization, a second token may be added thereto. The method by which the decision to add a second token is made may best be described by reference to the decisional flow diagram of FIG. 5.

Therein, the system is initiated in step 500 where only one token is provided and each BIU waits to receive that token, step 502. After receiving the token, the BIU determines whether this token is a permanent token, step 504. It is noted that, in this particular embodiment, it is necessary to identify the tokens such that a second added token may later be destroyed without fear that two BIUs may simultaneously destroy both tokens. To avoid such occurrence, one token is identified as a first or permanent token never to be destroyed and each subsequently added token is identified as a second or subsequent token which may be destroyed as described below. Identification of tokens can be by any method known in the art. In the present embodiment, an information field is reserved for token identification.

Where the token received is the permanent token, the subject BIU determines whether the token acquisition time $t_a$ is greater than a predetermined maximum token acquisition time $t_1$, step 506, and if not, the BIU proceeds to transmit this token, with or without an information packet, step 404, as described herein with reference to FIG. 4. As mentioned above, the token acquisition time $t_a$ is that time period occurring from the instant where a BIU has transmitted a token to the instant where the BIU has received a token, whether or not the transmitted token is the same as the received token. The predetermined maximum token acquisition time $t_1$ is a time interval indicative of high bus utilization, typically 60-70%, which may be determined by one skilled in the art, after considering such variables as the number of BIUs participating in the LAN, token passing time, i.e. the time necessary to pass a token from one BIU to a subsequent BIU, and token holding time, i.e. the time necessary for a BIU receiving a token to process the information therein and begin transmission of the token.

Where the token acquisition time $t_a$ is determined to be greater than the predetermined maximum token acquisition time $t_1$, the subject BIU will create a second token, step 508, before proceeding to transmit the received token, with or without an information packet, step 404 (FIG. 4).

In accordance with the present invention, the subject BIU creates a token by transmitting a solicit successor (SS) packet to all remaining BIUs coupled to the transmission bus. Each BIU coupled to the bus receives the SS packet and determines whether this packet originated from an upstream direction or a downstream direction as described hereinabove with reference to FIG. 3. Thereafter, each BIU which is in a downstream direction from the subject BIU will contend for access to transmission bus 102 such that it may transmit a null packet. Each upstream BIU which receives the SS packet will transmit its own null packet after a predetermined time interval if no other null packet is received. A null packet is simply one which identifies the BIU from which it originated.

Of each downstream BIU attempting to transmit a null packet, only the upstream-most BIU will be successful as described hereinabove with reference to FIG. 4. In the case where the downstream-most BIU transmits the SS packet, BIU 100-1 in FIG. 1, and therefore no BIU receives a null packet during the initial time interval, each upstream BIU will attempt to transmit a null packet with the upstreammost BIU, BIU 100-N in FIG. 1, succeeding. The surviving null packet identifies the BIU wherein it originated and, when received by this BIU, identifies it as the one to begin passing of the new token.

After determining which BIU is to create a new token, that BIU will create the token such that the new token will traverse the logical ring of the local area network approximately 180° away from the existing token. Logical ring, as used herein, is consistent with its definition as used in the art, to wit, a software concept indicating the flow of a token from BIU to BIU (typically in order of decending BIU numerical addresses). It will be appreciated by those skilled in the art, that the BIUs may be located in an arbitrary physical order along the bus. Therefore, the second token must be created 180° out of phase with the first token along the logical ring. This is accomplished by determining the token acquisition time upon receipt of the existing token and, after transmitting the existing token, waiting for a time interval equal to the measured token acquisition time divided by two, i.e. $t_a/2$, and thereafter transmitting the new token with or without an information packet, step 404 (FIG. 4).

Returning to FIG. 5, when the token received is not the permanent token, the subject BIU will determine whether the token acquisition time is less than a predetermined minimum token acquisition time $t_2$, step 510. The predetermined minimum token acquisition time $t_2$, in contrast to the predetermined maximum token acquisition time $t_1$, provides an indication of low bus utilization. This time interval may be chosen in similar manner to the maximum token acquisition time and is typically chosen to provide an indication of less than 50% bus utilization.

Where the token acquisition time $t_a$ is not less than the predetermined minimum token acquisition time $t_2$, the subject BIU will proceed to transmit its token, with or without an information packet, step 404 (FIG. 4). Alternatively, where the token acquisition time $t_a$ is less than the predetermined minimum token acquisition time $t_2$, the subject BIU will destroy the token it controls, step 512, and will transmit any information packet, step 404 (FIG. 4), without this token.

Destruction of a token can be accomplished in any of several ways which will be apparent to those skilled in the art. In the subject embodiment, a BIU destroys a token simply by not transmitting the token. Thus, the step of destroying a token in FIG. 5 would include not executing step 407 (FIG. 4), i.e. not retrieving a token from memory before transmitting. Further, when the BIU has no message to transmit, the BIU will return to wait to receive token, step 502 (FIG. 5).

Figure 5:
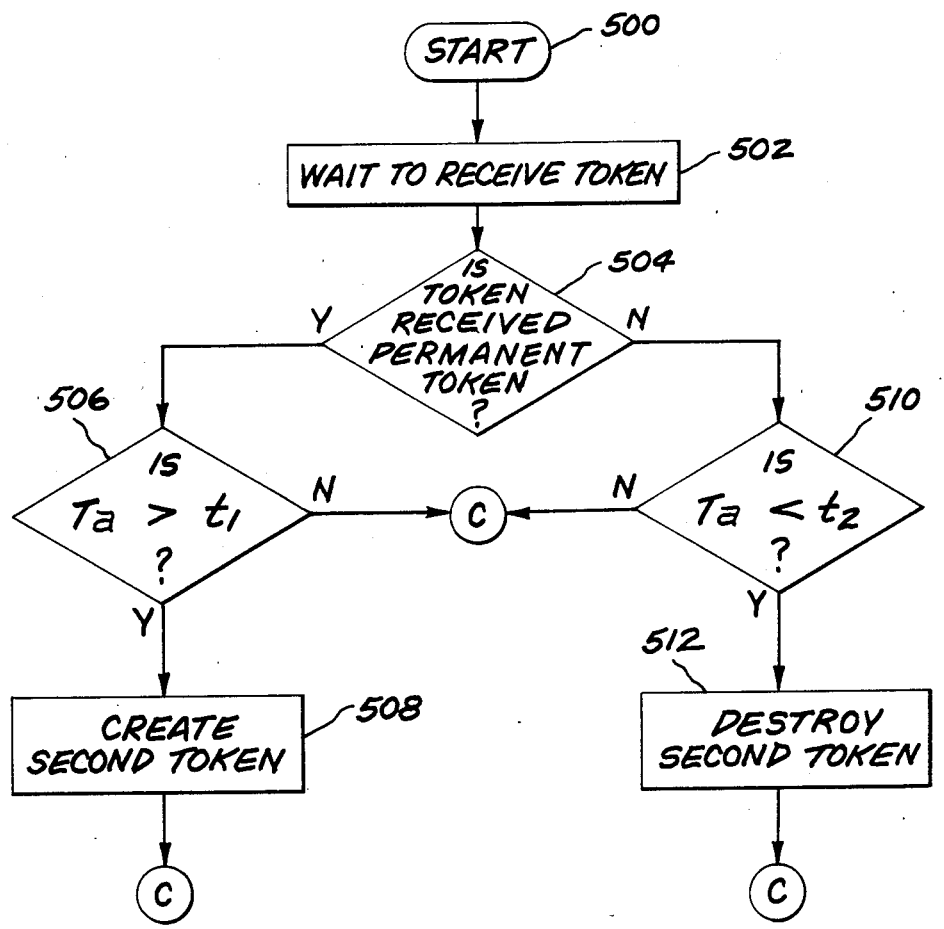
FIG. 5 is a decisional flow diagram illustrating the method by which the tokens are created or destroyed by the BIUs of the LAN.

In the embodiment of FIG. 5, when the BIU has completed transmission, step 418, or when no transmission is necessary as described above, the BIU will execute step 420 returning to step 502 where it will again wait to receive a token.

In a further improvement to each of the embodiments described above, each token in the LAN is designated to allow transmission of only packets having a predetermined priority. Where one token is designated as permitting transmission of packets having a first priority, only BIUs having first priority packets will be permitted to transmit while in control of this token. It will be noted that where one token is designated to permit transmission of only packets having a high priority, this token will traverse the bus at a faster rate than a token designated to allow transmission of low priority packets. This is because there will be less high priority packets to be transmitted and, therefore, the high priority token will not be substantially delayed while the BIU prepares information packets for transmission and transmits these packets. Thus, by designating the tokens to allow transmission of only packets having a predetermined priority, prioritization of information packets is possible.

Assigning a priority to tokens can be accomplished by any known method. In the subject embodiment, this is accomplished by identifying the token in the same manner as mentioned above for identifying a token as either a permanent or secondary token.

While only several presently preferred embodiments of my novel token passing LAN have been presented in detail herein, many modifications and variations will now become apparent to those skilled in the art. It is my intent, therefore, to be limited only by the scope of the appended claims and not by the specific details presented herein.

What I claim is:

1. A method for transferring information between a plurality of bus interface units (BIUs) of a local area network (LAN) wherein a first token is passed from BIU to BIU, said BIUs being allowed to transmit when in control of said first token, said first token being designated to allow transmission of packets having a first predetermined priority, said second token being designated to allow transmission of packets having a second predetermined priority, said method comprising the step of:

providing a second token to be passed from BIU to BIU, each said BIU being allowed to transmit information while in control of either said first or second token, said second token being present on said LAN simultaneously with said first token.

2. A method for transferring information between a plurality of bus intereface units (BIUs) of a local area network (LAN) wherein a first token is passed from BIU to BIU, said BIUs being allowed to transmit when in control of said first token, said first token being designated to allow transmission of packets having a first predetermined priority, said second token being designated to allow transmission of packets having a second predetermined priority, said method comprising the steps of:

providing a second token to be passed from BIU to BIU, each said BIU being allowed to transmit information while in control of either said first or second token, said second token being present on said LAN simultaneously with said first token; and allowing each said BIU to contend for said bus, such that it may transfer an information packet only while in control of said first or second token.

3. A method for transferring information between a plurality of bus interface units (BIUs) of a local area network (LAN) wherein a first token is passed from BIU to BIU, said BIUs being arranged to transfer information from BIU to BIU via a common transmission bus having first and second ends, each said BIU being associated with a directional coupler to enable said BIU to determine whether information placed on said bus originated from said first end direction or said second end direction with respect to said BIU, said BIUs being allowed to transmit when in control of said first token, said method comprising the steps of:

providing a second token to be passed from BIU to BIU, each said BIU being allowed to transmit information while in control or either said first or second token, said second token being present on said LAN simultaneously with said first token; and allowing each said BIU to contend for said bus, such that it may transfer an information packet only while in control of said first or second token;

said step allowing said BIUs to contend for said bus including the substeps of:

monitoring said bus before transmission of a packet to determine whether said bus is busy;

delaying transmission of a packet if said bus is busy;

initiating transmission of a packet if said bus is not busy;

monitoring said bus during initiation of transmission to determine whether another said BIU is attempting to initiate transmission; and discontinuing transmission if another said BIU is attempting to initiate transmission if another said BIU is placed said packet on said bus from said first end direction with respect to said BIU.

4. The method as recited in claim 3 wherein said first token is designated to allow transmission of packets having a first predetermined priority and wherein said second token is designated to allow transmission of packets having a second predetermined priority.

5. A method for transferring information between a plurality of bus interface units (BIUs) of a local area network (LAN) wherein a first token is passed from BIU to BIU, said BIUs being allowed to transmit when in control of said first token, said method comprising the step of:

(a) monitoring the token rotation time to determine whether said token rotation time is greater than a first predetermined time interval; and (b) providing a second token if said token rotation time is determined to be greater than said first time interval, said BIUs being allowed to transmit information while in control of said first or second tokens.

6. The method as recited in claim 5 wherein said first token is designated to allow transmission of packets having a first predetermined priority and wherein said second token is designated to allow transmission of packets having a second predetermined priority.

7. The method as recited in claim 5 wherein said second token is provided such that it will traverse the logical ring approximately 180° out of phase with said first token.

8. The method as recited in claim 5 further including the step of:

allowing each said BIU to contend for said bus, such that it may transfer an information packet while in control of said first or second token.

9. The method as recited in claim 8 wherein said first token is designated to allow transmission of packets having a first predetermined priority and wherein said second token is designated to allow transmission of packets having a second predetermined priority.

10. The method as recited in claim 8 wherein said second token is provided such that it will traverse the logical ring approximately 180° out of phase with said first token.

11. The method as recited in claim 8 wherein said BIUs are arranged to transfer information from BIU to BIU via a common transmission bus having first and second ends, each said BIU being associated with a directional coupler to enable said BIU to determine whether information placed on said bus originated from said first end direction or said second end direction with respect to said BIU, said step of allowing said BIUs to contend for said bus including the substeps of:

(a) monitoring said bus before transmission of a packet to determine whether said bus is busy;

(b) delaying transmission of a packet if said bus is busy;

(c) initiating transmission of a packet if said bus is not busy;

(d) monitoring said bus during initiation of transmission to determine whether another said BIU is attempting to initiate transmission; and (e) discontinuing transmission if another said BIU is attempting to initiate transmission and said other BIU placed said packet on said bus from said first end direction with respect to said BIU.

12. The method as recited in claim 11 wherein said first token is designated to allow transmission of packets having a first predetermined priority and wherein said second token is designated to allow transmission of packets having a second predetermined priority.

13. The method as recited in claim 11 wherein said second token is provided such that it will traverse the logical ring approximately 180° out of phase with said first token.

14. The method as recited in claim 5 further comprising the steps of:

(a) identifying said first and second tokens such that each said BIU can distinguish therebetween;

(b) monitoring said token rotation time to determine whether said token rotation time is less than a second predetermined time interval; and (c) destroying said second token if said token rotation time is determined to be less than said second time interval.

15. The method as recited in claim 14 wherein said first token is designated to allow transmission of packets having a first predetermined priority and wherein said second token is designated to allow transmission of packets having a second predetermined priority.

16. The method as recited in claim 14 wherein said second token is provided such that it will traverse the logical ring approximately 180° out of phase with said first token.

17. The method as recited in claim 14 further including the step of:

allowing each said BIU to contend for said bus, such that it may transfer an information packet only while in control of said first or second token.

18. The method as recited in claim 17 wherein said first token is designated to allow transmission of packets having a first predetermined priority and wherein said second token is designated to allow transmission of packets having a second predetermined priority.

19. The method as recited in claim 17 wherein said second token is provided such that it will traverse the logical ring approximately 180° out of phase with said first token.

20. The method as recited in claim 17 wherein said BIUs are arranged to transfer information from BIU to BIU via a common transmission bus having first and second ends, each said BIU being associated with a directional coupler to enable said BIU to determine whether information placed on said bus originated from said first end direction or said second end direction with respect to said BIU, said step of allowing said BIUs to contend for said bus including the substeps of:

(a) monitoring said bus before transmission of a packet to determine whether said bus is busy;

(b) delaying transmission of a packet if said bus is busy;

(c) initiating transmission of a packet if said bus is not busy;

(d) monitoring said bus during initiation of transmission to determine whether another said BIU is attempting to initiate transmission; and (e) discontinuing transmission if another said BIU is attempting to initiate transmission and said other BIU placed said packet on said bus from said first end direction with respect to said BIU.

21. The method as recited in claim 20 wherein said first token is designated to allow transmission of packets having a first predetermined priority and wherein said second token is designated to allow transmission of packets having a second predetermined priority.

22. The method as recited in claim 20 wherein said second token is provided such that it will traverse the logical ring approximately 180° out of phase with said first token.

* * * * *